(12) United States Patent
Farner

(10) Patent No.: US 8,336,849 B2
(45) Date of Patent: Dec. 25, 2012

(54) CONICAL SEAT SHUT OFF VALVE

(75) Inventor: Bruce R. Farner, Slidell, LA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 336 days.

(21) Appl. No.: 12/704,193

(22) Filed: Feb. 11, 2010

(65) Prior Publication Data

US 2011/0193001 A1  Aug. 11, 2011

(51) Int. Cl.
*F16K 31/12* (2006.01)
(52) U.S. Cl. ........ 251/31; 251/30.01; 251/282; 251/325
(58) Field of Classification Search ............ 251/30, 251/30.02, 30.01, 282, 312, 30.05, 31, 325; 137/487.5
See application file for complete search history.

(56) References Cited

U.S. PATENT DOCUMENTS

| | | | | |
|---|---|---|---|---|
| 845,063 | A * | 2/1907 | Desper | 137/219 |
| 1,829,703 | A * | 10/1931 | Larner | 137/219 |
| 2,592,474 | A * | 4/1952 | Schnyder | 137/219 |
| 2,601,989 | A * | 7/1952 | Modes | 137/625.4 |
| 2,919,714 | A * | 1/1960 | Mrazek | 137/220 |
| 3,533,434 | A * | 10/1970 | Smith | 137/220 |
| 3,669,143 | A * | 6/1972 | Reese | 137/512.3 |
| 3,825,026 | A * | 7/1974 | Salerno et al. | 137/219 |
| 5,904,177 | A * | 5/1999 | Mullin et al. | 137/503 |
| 5,979,862 | A * | 11/1999 | Wolfges | 251/30.01 |
| 6,062,530 | A | 5/2000 | Hajjar | |
| 6,227,247 | B1 * | 5/2001 | Abel | 137/625.62 |
| 6,830,229 | B2 | 12/2004 | Wetzel et al. | |
| 6,955,331 | B2 | 10/2005 | Larsen et al. | |

OTHER PUBLICATIONS

Three pages of product drawing sheets from the company Precision Fluid Controls showing several different views of a flow control valve.

* cited by examiner

*Primary Examiner* — Eric Keasel
*Assistant Examiner* — Angelisa Hicks
(74) *Attorney, Agent, or Firm* — Randall Heald; Michelle Ford; Brian Andress

(57) ABSTRACT

A valve includes a housing defining a bore having an inlet and extending along a longitudinal axis. A head is attached to the housing and defines a head passage having an outlet. A piston is disposed within the bore and includes a piston passage extending through the piston along the longitudinal axis. The piston is moveable between a closed position in which a sealing end of the piston abuts a seat of the head to close fluid communication through the piston passage and an open position in which the sealing end of the piston is axially spaced along the longitudinal axis from the seat of the head to permit fluid communication through the piston passage between the inlet and the outlet. The housing defines an equalizing chamber in fluid communication with the head passage for damping movement of the piston.

26 Claims, 4 Drawing Sheets

CONICAL SEAT SHUT OFF VALVE

ORIGIN OF THE INVENTION

The invention described herein was made by an employee of the United States Government and may be manufactured and used by or for the Government of the United States of America for governmental purposes without the payment of any royalties thereon or therefor.

TECHNICAL FIELD

The subject invention generally relates to a fluid valve, and more specifically to an axially moving shut off valve for a high pressure working fluid.

BACKGROUND OF THE INVENTION

Fluid valves are utilized to control a flow of a working fluid through a system of pipes. The valves are utilized to open and close fluid communication between two points within the system. There are many types of valves that exist, such as a ball valve, a gate valve, a butterfly valve, a globe valve, etc.

The various types of valves typically include a housing and a seat. In high pressure applications, the housing and seat are often manufactured from a metal material. Accordingly, movement of the seat to open and close the valve moves the metal seat against the metal housing. The large forces acting on the valves generate a high-friction load on the seat during movement of the seat. The high friction between the seat and the housing, in combination with the metal on metal interface between the seat and the housing, may potentially damage the seat.

Additionally, the valves typically require an actuator, such as a handle, rotary knob, motor, etc., to operate the valve. For high-pressure working fluids, the actuators become large, greatly increasing the overall size and cost of the valve.

SUMMARY OF THE INVENTION

The present invention provides a valve for controlling a flow of a pressurized working fluid. The valve includes a housing defining a bore. The bore includes an inlet, and extends along a longitudinal axis. The valve further includes a head attached to the housing. The head defines a head passage having an outlet. A piston is disposed within the bore. The piston defines a piston passage through the piston along the longitudinal axis. The piston passage communicates the pressurized working fluid therethrough. The piston is moveable between an open position and a closed position. When in the open position, the piston allows fluid communication between the inlet and the outlet. When in the closed position, the piston prevents fluid communication between the inlet and the outlet. The housing defines an equalizing chamber in fluid communication with the head passage. The equalizing chamber is configured for communicating a fluid pressure between the head passage and the equalizing chamber. The fluid pressure in the equalizing chamber dampens movement of the piston between the closed position and the open position.

In another aspect of the present invention, a valve system for controlling a flow of a pressurized working fluid is provided. The valve system includes a valve. The valve includes a housing defining a bore. The bore includes an inlet, and extends along a longitudinal axis. The valve further includes a head attached to the housing. The head defines a head passage having an outlet. A piston is disposed within the bore. The piston defines a piston passage through the piston along the longitudinal axis. The piston passage communicates the pressurized working fluid therethrough. The piston is moveable between an open position and a closed position. The open position allows fluid communication between the inlet and the outlet. The closed position prevents fluid communication between the inlet and the outlet. The housing and the piston cooperate together to define a first pressure chamber and a second pressure chamber. The first pressure chamber is configured for receiving the pressurized working fluid from one of the bore and the head passage to urge the piston into the closed position. The second pressure chamber is configured for receiving the pressurized working fluid from one of the bore and the head passage to urge the piston into the open position. The housing defines an equalizing chamber in fluid communication with the head passage. The equalizing chamber is configured for communicating a fluid pressure between the head passage and the equalizing chamber. The fluid pressure in the equalizing chamber dampens movement of the piston between the closed position and the open position. The valve system further includes a first control device and a second control device. The first control device is configured for selectively controlling fluid flow between the first pressure chamber and one of the inlet and the outlet. The second control device is configured for selectively controlling fluid flow between the second pressure chamber and one of the inlet and the outlet.

In another aspect of the present invention, a valve for controlling a flow of a pressurized working fluid is provided. The valve includes a housing defining a bore. The bore includes an inlet, and extends along a longitudinal axis. The valve further includes a head attached to the housing. The head defines a head passage having an outlet. A piston is disposed within the bore and defines a piston passage through the piston along the longitudinal axis. The piston passage communicates the pressurized working fluid therethrough. The piston is moveable between an open position and a closed position. The open position allows fluid communication between the inlet and the outlet. The closed position prevents fluid communication between the inlet and the outlet. The valve further includes a drive mechanism coupled to the piston. The drive mechanism is configured for moving the piston along the longitudinal axis between the open position and the closed position. The drive mechanism further secures the piston in an intermediate position between the open position and the closed position. The housing defines an equalizing chamber in fluid communication with the head passage. The equalizing chamber is configured for communicating a fluid pressure between the head passage and the equalizing chamber. The fluid pressure in the equalizing chamber dampens movement of the piston between the closed position and the open position.

Accordingly, the present invention provides an axially moving piston to open and close the valve. The axially moving piston operates as a valve seat and is moved axially into sealing engagement with the head. Accordingly, because the working fluid flows axially through the piston, the pressure of the working fluid does not increase the frictional force acting on the piston as the piston is moved between the open position and the closed position. Additionally, the sealing surface, i.e., valve seat, of the piston does not slide on or across the housing as the piston is moved between the open position and the closed position, thereby preventing potential damage to the sealing surface of the piston. The equalizing chamber applies a fluid pressure force to the piston to minimize a pressure differential, acting on the piston, between the inlet and the outlet of the valve. Accordingly, because of the fluid pressure within the equalizing chamber, only a minimal force is required to move the piston between the open position and the closed position.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
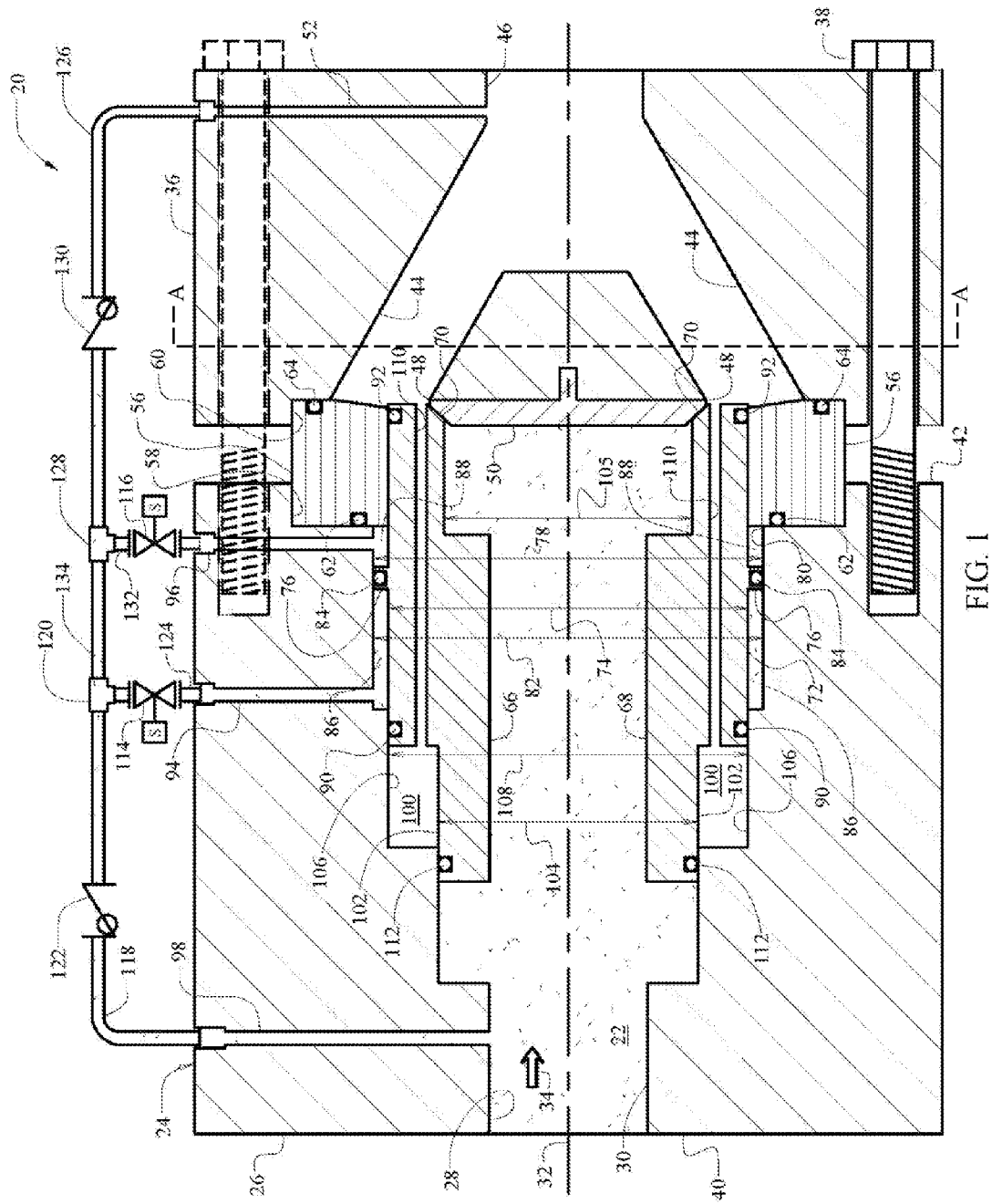
FIG. 1 is a schematic cross sectional view of a valve system showing a valve in a closed position.
Figure 2:
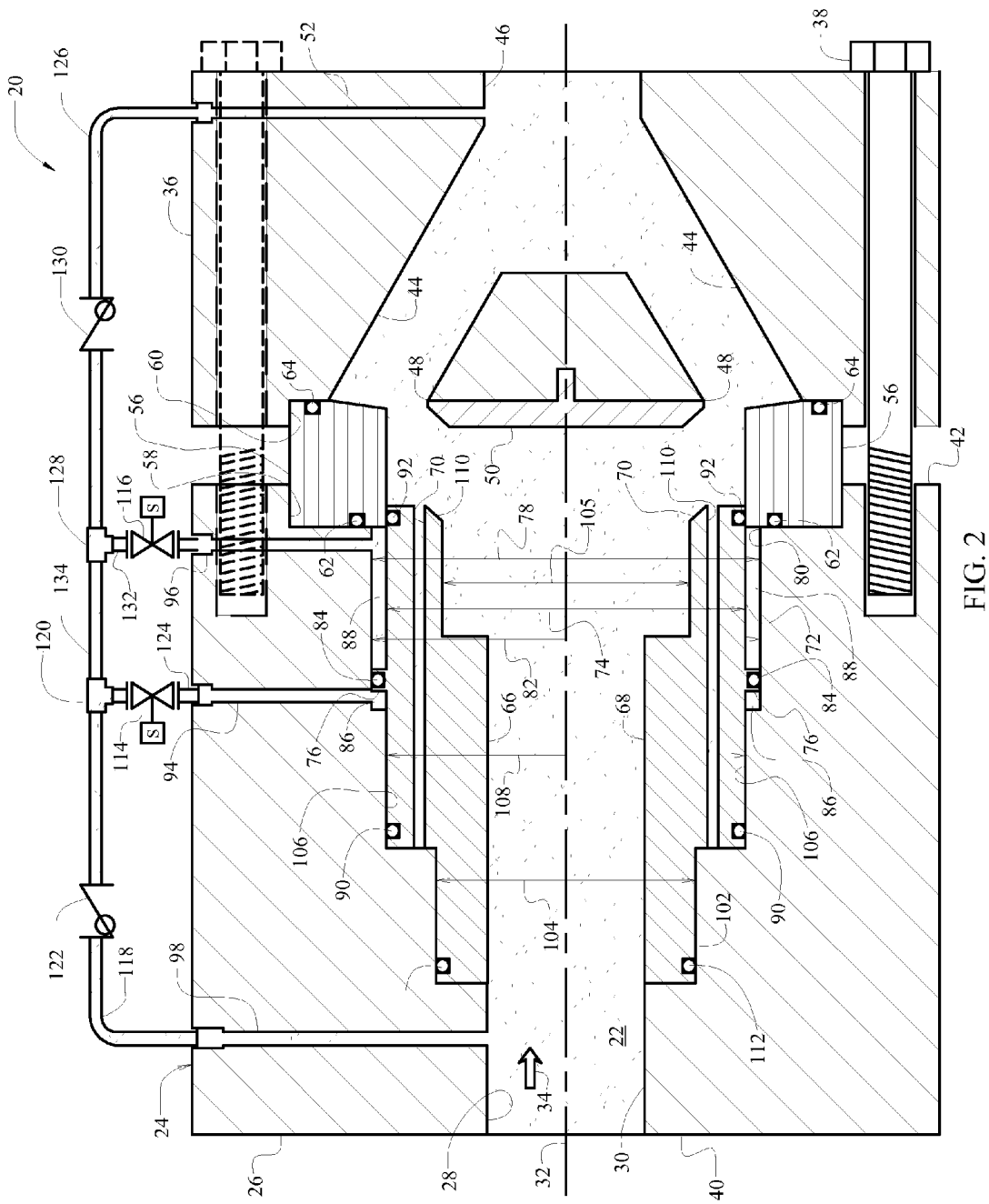
FIG. 2 is a schematic cross sectional view of the valve system showing the valve in an open position.
Figure 4:
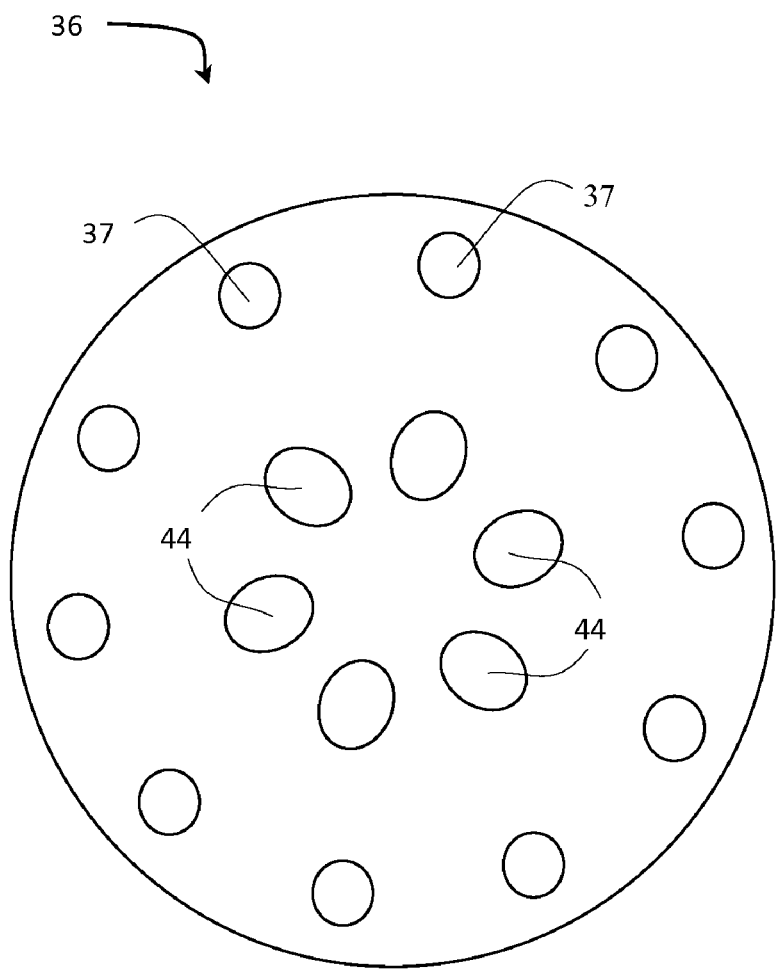
FIG. 4 is a schematic cross-section view A-A taken along the section line A in FIG. 1.

Referring to FIGS. 1, 2, and 4, wherein like numerals indicate like parts throughout the several views, a valve system 20 is shown generally at 20. The valve system 20 controls a flow of a pressurized working fluid 22 through a system 20 of pipes. The working fluid 22 may include any fluid transmitted through pipes. Accordingly, the working fluid 22 is not limited to any specific fluid. The valve system 20 may be configured and/or sized to accommodate the working fluid 22 within a wide range of pressures. Accordingly, the valve system 20 is not limited to operation within any specific pressure range.

The valve system 20 includes a shut off valve 24. The valve 24 controls a flow of the working fluid 22 between two points within the system 20 of pipes. The valve 24 includes a housing 26. The housing 26 defines a bore 28, which includes an inlet 30 and extends along a longitudinal axis 32 through the housing 26. The working fluid 22 enters the valve 24 through the inlet 30 and flows along the longitudinal axis 32 in a direction indicated by arrow 34.

The valve 24 further includes a head 36. The head 36 is attached to the housing 26. A plurality of fasteners 38 extend through fastener openings 37 in the head 36 into threaded engagement with the housing 26 to attach the head 36 to the housing 26. However, it should be appreciated that the head 36 may be attached to the housing 26 in some other manner not shown or described herein that is capable of securely attaching the head 36 to the housing 26 and withstanding the operating pressures of the working fluid 22. The housing 26 includes a first end 40 at which the inlet 30 is disposed, and extends along the longitudinal axis 32 to a second end 42. The head 36 is attached to the housing 26 at the second end 42, opposite the inlet 30 of the housing 26.

The head 36 defines a head passage 44 having an outlet 46. Accordingly, the working fluid 22 flows from the inlet 30 through the head passage 44 and exits the valve 24 through the outlet 46 of the head 36. The head 36 defines a plurality of openings 48 positioned for receiving the flow of the working fluid 22 from the housing 26. The plurality of openings 48 are positioned radially about the longitudinal axis 32, and are spaced equidistant from each other around the longitudinal axis 32. The head passage 44 includes a plurality of head passages 44. As best shown in FIG. 4, a cross-section view A-A taken along section line A in FIG. 1, each of the plurality of head passages 44 extends from one of the plurality of openings 48. Each of the plurality of head passages 44 extends inward toward the longitudinal axis 32, and also extends along the longitudinal axis 32 toward and converging at the outlet 46. As such, it should be appreciated that the plurality of head passages 44 are angled toward the longitudinal axis 32, and cooperate to define a generally conical shaped portion therebetween. Additionally, it should also be appreciated that the head passage 44 may include some other shape and/or configuration of passages, and be oriented in some other manner not shown or described herein.

The head 36 includes a seat 50 disposed radially inward about the longitudinal axis 32 relative to the plurality of openings 48. As such, the seat 50 is disposed between the plurality of openings 48, within an inner circumference defined by the plurality of openings 48 concentric with the longitudinal axis 32. Preferably, the seat 50 includes and is manufactured from copper. However, it should be appreciated that the seat 50 may include and be manufactured from some other material not shown or described herein. The seat 50 may be integrally formed with the head 36. Alternatively, the seat 50 may be attached to the head 36 in any suitable manner.

The head 36 defines an outlet passage 52 extending between the outlet 46 of the head passage 44 and an outer head 36 surface. As shown, the outlet passage 52 extends radially outward from the longitudinal axis 32. However, it should be appreciated that the outlet passage 52 may include some other shape and be oriented in some other manner not shown or described herein.

The valve 24 further includes a bushing 56. The bushing 56 is disposed between the housing 26 and the head 36. The housing 26 defines a housing recess 58 concentric with the longitudinal axis 32 and disposed on the second end 42 of the housing 26. The bushing 56 is seated within the housing recess 58. Alternatively, the bushing 56 may be coupled to the housing 26 via a threaded connection or some other connection suitable for aligning the bushing 56 with the longitudinal axis 32 and securing the bushing 56 in place relative to the housing 26. The head 36 defines a head recess 60 concentric with the longitudinal axis 32 and disposed opposite the housing recess 58. The bushing 56 is seated within the head recess 60. Alternatively, the bushing 56 may be coupled to the head 36 via a threaded connection or some other connection suitable for aligning the bushing 56 with the longitudinal axis 32 and securing the bushing 56 in place relative to the housing 26.

The valve 24 further includes a first bushing seal 62 and a second bushing seal 64. The first bushing seal 62 is configured for sealing between the bushing 56 and the bore 28. The second bushing seal 64 is configured for sealing between the bushing 56 and the head passage 44. The first bushing seal 62 and the second bushing seal 64 may include any type and/or configuration of seal suitable for the type of working fluid 22 utilized and for the operating pressure of the working fluid 22.

The valve 24 further includes a piston 66 disposed within the bore 28. The piston 66 defines a piston passage 68 extending completely through the piston 66 along the longitudinal axis 32. The piston passage 68 communicates the pressurized working fluid 22 therethrough. The piston 66 includes a sealing end 70, and is moveable between an open position, shown in F*igure* 2, and a closed position, shown in F*igure* 1. When in the open position, the sealing end 70 of the piston 66 is spaced from the seat 50 of the head 36 along the longitudinal axis 32 to allow fluid communication between the inlet 30 and the outlet 46. When in the closed position, the sealing end 70 of the piston 66 abuts the seat 50 of the head 36 in sealing engagement to prevent fluid communication between the inlet 30 and the outlet 46. Accordingly, when the piston 66 is in the open position, the working fluid 22 enters the valve 24 through the inlet 30, flows through the piston passage 68, enters the head 36 through the plurality of openings 48 and flows through the plurality of openings 48 into the outlet 46. When the piston 66 is in the closed position, the sealing end 70 of the piston 66 engages the seat 50 and blocks fluid communication between the piston passage 68 and the plurality of openings 48 in the head 36, thereby closing fluid communication between the inlet 30 and the outlet 46.

The bushing 56 radially supports the piston 66 about the longitudinal axis 32 and guides the piston 66 during movement along the longitudinal axis 32 between the open position and the closed position. Accordingly, the bushing 56 maintains a proper alignment of the piston 66 along the longitudinal axis 32.

The piston 66 includes a first portion 72 defining a first diameter 74, and an annular collar portion 76 defining a second diameter 78. The second diameter 78 of the annular collar portion 76 is greater than the first diameter 74 of the first portion 72 of the piston 66. The annular collar portion 76 extends radially outward from the longitudinal axis 32, and is disposed at an approximate midsection of the first portion 72. Accordingly, the annular collar portion 76 bisects the first portion 72 of the piston 66 into substantially equal halves. The bore 28 includes a first section 80 defining a bore diameter 82.

The valve 24 further includes a collar seal 84. The collar seal 84 is disposed on a radially outer surface of the annular collar portion 76. The collar seal 84 is configured for sealing against the first section 80 of the bore 28, i.e., the collar seal 84 seals between the first section 80 of the bore 28 and the annular collar portion 76 of the piston 66. The bore diameter 82 is substantially equal to the second diameter 78 of the annular collar portion 76, with the difference between the bore diameter 82 and the second diameter 78 being only large enough to allow proper functioning of the collar seal 84. Accordingly, it should be appreciated that the difference between the bore diameter 82 and the second diameter 78 will vary with the specific type and or configuration of the collar seal 84. The collar seal 84 may include any type and/or configuration of seal suitable for the type of working fluid 22 utilized and for the operating pressure of the working fluid 22.

The housing 26 and the piston 66 cooperate together to define a first pressure chamber 86 and a second pressure chamber 88. The first pressure chamber 86 is configured for receiving the pressurized working fluid 22 from one of the bore 28 and the head passage 44 to urge the piston 66 into the closed position. The second pressure chamber 88 is configured for receiving the pressurized working fluid 22 from one of the bore 28 and the head passage 44 to urge the piston 66 into the open position.

The first pressure chamber 86 and the second pressure chamber 88 are disposed on radially opposing surfaces or sides of the annular collar portion 76. Accordingly, the first pressure chamber 86 is disposed on a first side of the annular collar portion 76 and the second pressure chamber 88 is disposed on a second side of the annular collar portion 76.

In operation, to move the piston 66 into the closed position, the working fluid 22 is directed into the first pressure chamber 86. The second pressure chamber 88 is vented to ensure no pressure exists within the second pressure chamber 88 that would resist the pressure exerted by the working fluid 22 in the first pressure chamber 86. The pressure from the working fluid 22 in the first pressure chamber 86 exerts a force on the annular collar portion 76 axially along the longitudinal axis 32 to move the piston 66 axially along the longitudinal axis 32 into the closed position, with the sealing end 70 of the piston 66 abutting the seat 50 of the head 36. Accordingly, the sealing end 70 of the piston 66 moves axially into engagement with the seat 50, and does not slide or otherwise rotate against the seat 50. To move the piston 66 into the open position, the working fluid 22 is directed into the second pressure chamber 88. The first pressure chamber 86 is vented to ensure no pressure exists within the first pressure chamber 86 that would resist the pressure exerted by the working fluid 22 in the second pressure chamber 88. The pressure from the working fluid 22 in the second pressure chamber 88 exerts a force on the annular collar portion 76 axially along the longitudinal axis 32 to move the piston 66 axially along the longitudinal axis 32 into the open position, with the sealing end 70 of the piston 66 spaced from the seat 50 of the head 36. As shown and described herein, the movement of the piston 66 is controlled by the working fluid 22 flowing through the valve 24. However, it should be appreciated that an independent fluid, such as air, nitrogen, or water, from an exterior source, may alternatively be utilized to control the movement of the piston 66.

The valve 24 further includes a first piston seal 90 and a second piston seal 92. The first piston seal 90 is configured for sealing the first pressure chamber 86 from the bore 28. The second piston seal 92 is configured for sealing the second pressure chamber 88 from the bore 28. More specifically, the second piston seal 92 is disposed between the piston 66 and the bushing 56. The collar seal 84 is disposed axially along the longitudinal axis 32 between the first piston seal 90 and the second piston seal 92. The first piston seal 90 and the second piston seal 92 may include any type and/or configuration of seal suitable for the type of working fluid 22 utilized and for the operating pressure of the working fluid 22.

The housing 26 defines a first pressure chamber passage 94 and a second pressure chamber passage 96. The first pressure chamber passage 94 extends between the first pressure chamber 86 and an outer surface of the housing 26. The second pressure chamber passage 96 extends between the second pressure chamber 88 and the outer surface of the housing 26. The housing 26 further defines an inlet passage 98, which extends between the inlet 30 of the bore 28 and the outer surface of the housing 26.

As shown, the first pressure chamber passage 94, the second pressure chamber passage 96 and the inlet passage 98 each extend radially outward from the longitudinal axis 32. However, it should be appreciated that the first pressure chamber passage 94, the second pressure chamber passage 96 and the inlet passage 98 may include some other shape and be oriented in some other manner not shown or described herein.

The housing 26 defines an equalizing chamber 100. The equalizing chamber 100 is in fluid communication with the head passage 44 of the head 36. The equalizing chamber 100 is configured for communicating a fluid pressure between the head passage 44 and the equalizing chamber 100 to dampen movement of the piston 66 between the closed position and the open position. The equalizing chamber 100 is disposed within the housing 26 in a position suitable to exert an axial force along the longitudinal axis 32 on the first portion 72 of the piston 66. The pressure within the equalizing chamber 100 counteracts the pressure exerted from the working fluid 22 downstream of the seat 50 in the head passage 44. Accordingly, the pressure within the equalizing chamber 100 counteracts and dampens the movement of the piston 66 from the closed position into the open position, and balances the forces on the piston 66 to be independent of the pressures at the inlet 30 and the outlet 46 thereby minimizing rapid and abrupt movement of the piston 66 into the open position.

As shown, the bore 28 and the piston 66 cooperate together to define the equalizing chamber 100. The piston 66 includes a second portion 102 having a diameter 104 less than the first diameter 74 of the first portion 72, and equal to a enlarged inside diameter 105 of the piston 66. The bore 28 includes a second section 106 having a diameter 108 less than the bore diameter 82 of the first section 80. The difference between the diameter of the second portion 102 of the piston 66 and the bore diameter 82 of the section of the bore 28 defines the equalizing chamber 100.

The piston 66 defines at least one port 110 extending longitudinally through the first portion 72 of the piston 66 between the equalizing chamber 100 and the head passage 44. The at least one port 110 provides fluid communication between the head passage 44 and the equalizing chamber 100 regardless of the position of the piston 66. As such, the at least one port 110 provides fluid communication between the head passage 44 and the equalizing chamber 100 when the piston 66 is in either of the open position and the closed position. It should be appreciated that the port 110 may be configured in some other manner capable of providing an equalization fluid pressure to the equalizing chamber 100.

The equalizing chamber 100 is sealed from the first pressure chamber 86, the second pressure chamber 88 and the inlet 30 of the bore 28. The first piston seal 90 seals the inlet 30 chamber from the first pressure chamber 86 and the second pressure chamber 88. A third piston seal 112 seals the equalizing chamber 100 from the inlet 30, and prevents the working fluid 22 from entering the equalizing chamber 100 from the inlet 30.

The valve system 20 includes a first control device 114 and a second control device 116. The first control device 114 is configured for selectively controlling fluid flow between the first pressure chamber 86 and one of the inlet 30 and the outlet 46. The second control device 116 is configured for selectively controlling fluid flow between the second pressure chamber 88 and one of the inlet 30 and the outlet 46.

As shown, a first control line 118 connects the inlet passage 98 with a first tee fitting 120. A first check valve 122 is disposed within the first control line 118 to prevent fluid flow into the inlet 30 of the bore 28. A second control line 124 connects the first pressure chamber passage 94 with the first tee fitting 120. The first control device 114 is disposed in-line with the second control line 124. A third control line 126 connects the outlet passage 52 with a second tee fitting 128. A second check valve 130 is disposed within the third control line 126 to prevent fluid flow into the outlet 46 of the head passage 44. A fourth control line 132 connects the second pressure chamber passage 96 with the second tee fitting 128. The second control device 116 is disposed in-line with the fourth control line 132. A fifth control line 134 connects the first tee fitting 120 and the second tee fitting 128.

The first control device 114 and the second control device 116 may each include a solenoid operated valve. However, it should be appreciated that the first control device 114 and the second control device 116 may include some other type of valve and be controlled by some other mechanism other than a solenoid. The first control device 114 and the second control device 116 operate to open and/or close fluid communication between the various control lines to provide the working fluid 22 to the first pressure chamber 86 or the second pressure chamber 88, or vent the first pressure chamber 86 or the second pressure chamber 88, as required to move the piston 66 between the open position and the closed position as described above. It should also be appreciate that the first control device 114 and the second control device 116, and the various control lines interconnecting the first control device 114 and the second control device 116 with the inlet passage 98, the first pressure chamber passage 94, the second pressure chamber passage 96, and the outlet passage 52 may be configured and oriented in some other manner other than shown and described herein.

Figure 3:
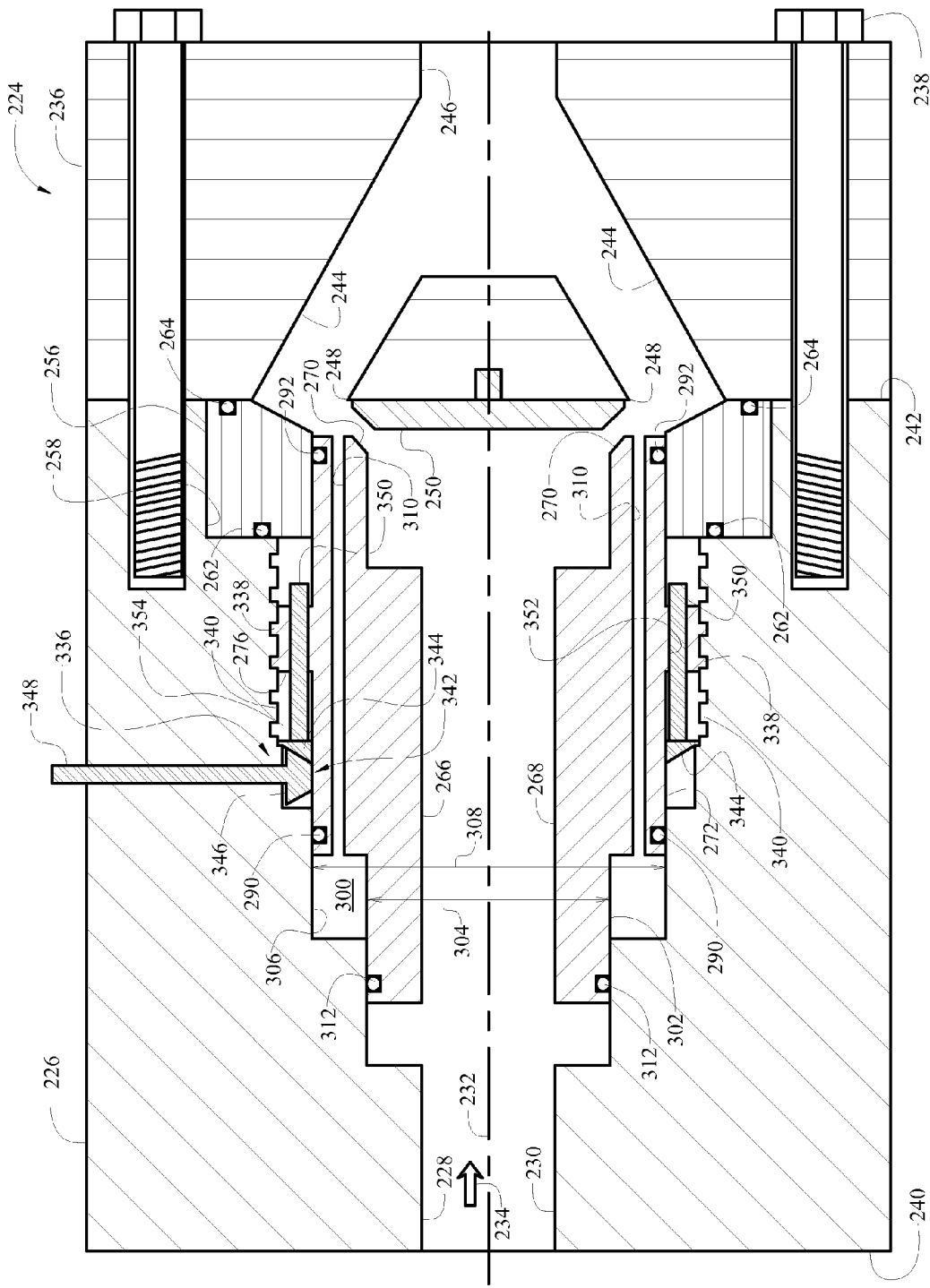
FIG. 3 is a schematic cross sectional view of an alternative embodiment of the valve.

Referring to FIG. 3, an alternative embodiment of the valve is shown generally at 224. The alternative embodiment of the valve 24 is configured to provide throttleable, i.e., variable, control over the flow rate of the working fluid 22 flowing through the valve 224. Throughout the description of the alternative embodiment of the valve 224, elements of the alternative embodiment of the valve 224 similar to the elements of the first embodiment of the valve 24 described above are identified with the same reference numeral increased by two hundred. For example, the inlet 30, which is identified by the reference numeral 30 in the first embodiment of the valve 24, is identified by the reference numeral 230 in the description of the alternative embodiment of the valve 224.

The alternative embodiment of the valve 224 includes a drive mechanism 336 coupled to the piston 266. The drive mechanism 336 is configured for moving the piston 266 along the longitudinal axis 232 between the open position and the closed position. Additionally, the drive mechanism 336 is capable of securing the piston 266 in an intermediate position between the open position and the closed position. It should be appreciated that the intermediate position may include any of an infinite number of positions disposed along the longitudinal axis 232 between the fully open position and the fully closed position. It should also be appreciated that the drive mechanism 336 may be configured in some other manner not shown or described herein capable of providing variable control over the flow rate of the working fluid 22.

Within the alternative embodiment of the valve 224, the piston 266 includes piston threads 338 and the bore 228 includes bore threads 340. The piston threads 338 are in threaded engagement with the bore threads 340 for threaded movement along the longitudinal axis 232. As such, rotation of the piston 266 about the longitudinal axis 232 moves the piston 266 along the longitudinal axis 232 via the threaded engagement between the piston threads 338 and the bore threads 340.

The drive mechanism 336 includes a bevel gear set 342 coupled to the piston 266. The bevel gear set 342 is configured for rotating the piston 266 about the longitudinal axis 232 to thread the piston 266 along the bore threads 340 and thereby move the piston 266 along the longitudinal axis 232. The bevel gear set 342 includes an annular ring gear 344 disposed concentrically about the longitudinal axis 232 and encircling the first portion 272 of the piston 266. The bevel gear set 342 further includes a stem gear 346 in meshing engagement with the annular ring gear 344. The stem gear 346 includes a stem portion 348 extending transversely outward from the longitudinal axis 232 to beyond the outer surface of the housing 226. As such, the stem gear 346 may be engaged from outside of the housing 226 to actuate the piston 266. The stem gear 346 may be actuated manually. However, it should be appreciated that the stem gear 346 may alternatively be actuated by a controller or the like, such as a motor. Rotation of the stem gear 346 causes the annular ring gear 344 to rotate about the longitudinal axis 232.

The drive mechanism 336 further includes at least one rod 350. Preferably, the at least one rod 350 includes a plurality of rods 350 radially spaced about the longitudinal axis 232 and equidistant from each other. The rods 350 extend from the annular ring gear 344 along the longitudinal axis 232 into sliding engagement with the piston 266. The rods 350 are configured for rotating the piston 266 about the longitudinal axis 232 in response to rotation of the annular ring gear 344 about the longitudinal axis 232. It should be appreciated that as the piston 266 rotates about the longitudinal axis 232 and thereby moves along the longitudinal axis 232, the piston 266 slides along the rods 350 towards or away from the annular ring gear 344.

As shown, the annular collar portion 276 of the piston 266 defines an aperture 352 for each of the rods 350, with each of the rods 350 extending through an aperture 352 of the annular collar portion 276. The apertures 352 extend along and are parallel with the longitudinal axis 232. However, it should be appreciated that the rods 350 may be coupled to the piston 266 in some other manner not shown or described herein.

The housing 226 and the piston 266 cooperate together to define a drive chamber 354 within the bore 228 with the drive mechanism 336 at least partially disposed within the drive chamber 354.

As described above, the housing 226 defines the equalizing chamber 300, which is in fluid communication with the head passage 244. The drive chamber 354 is sealed from the inlet 230, the equalizing chamber 300, and the head passage 244. More specifically, the first piston seal 290 and the third piston seal 312 cooperate to seal the drive chamber 354 from the inlet 230 and the equalizing chamber 300, and the second piston seal 292 seals the drive chamber 354 from the head passage 244.

Because the working fluid 222 flows axially along the longitudinal axis 232 through the piston passage 268, and the piston 266 moves axially along the longitudinal axis 232 between the open position, the closed position, and the intermediate position, the fluid pressure of the working fluid 222 does not effect the effort required to move the piston 266.

While the best modes for carrying out the invention have been described in detail, those familiar with the art to which this invention relates will recognize various alternative designs and embodiments for practicing the invention within the scope of the appended claims.

The invention claimed is:

1. A valve for controlling a flow of a pressurized working fluid, the valve comprising:
    a housing defining a bore having an inlet and extending along a longitudinal axis;
    a head attached to said housing and defining a head passage having an outlet;
    a piston disposed within said bore and defining a piston passage through said piston along said longitudinal axis for communicating the pressurized working fluid therethrough, said piston moveable between an open position allowing fluid communication between said inlet and said outlet, and a closed position preventing fluid communication between said inlet and said outlet;
    said housing defining an equalizing chamber in fluid communication with said head passage and configured for communicating a fluid pressure between said head passage and said equalizing chamber to dampen movement of said piston between said closed position and said open position;
    wherein said housing and said piston cooperate together to define a first pressure chamber and a second pressure chamber with said first pressure chamber configured for receiving the pressurized working fluid from one of said bore and said head passage to urge said piston into said closed position and said second pressure chamber configured for receiving the pressurized working fluid from one of said bore and said head passage to urge said piston into said open position; and
    a first piston seal configured for sealing said first pressure chamber from said bore and a second piston seal configured for sealing said second pressure chamber from said bore;
    wherein said piston includes a first portion defining a first diameter and an annular collar portion extending radially outward from said longitudinal axis at an approximate midsection of said first portion to define a second diameter greater than said first diameter.

2. A valve as set forth in claim 1 further comprising a bushing disposed between said housing and said head and radially supporting said piston for guided movement along said longitudinal axis between said open position and said closed position.

3. A valve as set forth in claim 2 wherein said second piston seal is disposed between said piston and said bushing.

4. A valve as set forth in claim 2 further comprising a first bushing seal and a second bushing seal with said first bushing seal configured for sealing between said bushing and said bore and a second bushing seal configured for sealing between said bushing and said head passage.

5. A valve as set forth in claim 1 wherein said bore includes a first section defining a diameter substantially equal to said second diameter of said annular collar portion.

6. A valve as set forth in claim 5 further comprising a collar seal disposed on a radially outer surface of said annular collar portion axially between said first piston seal and said second piston seal along said longitudinal axis, wherein said collar seal is configured for sealing against said first section of said bore, with said first pressure chamber and said second pressure chamber disposed on opposing radially surfaces of said annular collar portion.

7. A valve as set forth in claim 1 wherein said equalizing chamber is sealed from said first pressure chamber, said second pressure chamber and said inlet of said bore.

8. A valve as set forth in claim 7 wherein said bore and said piston cooperate together to define said equalizing chamber.

9. A valve as set forth in claim 8 wherein said piston defines at least one port extending longitudinally through said first portion of said piston between said equalizing chamber and said head passage.

10. A valve as set forth in claim 1 wherein said head defines a plurality of openings and said head passage includes a plurality of head passages with each of said plurality of head passages extending from one of said plurality of openings inward toward said longitudinal axis and along said longitudinal axis to said outlet.

11. A valve as set forth in claim 10 wherein said head includes a seat disposed radially inward about said longitudinal axis relative to said plurality of openings.

12. A valve as set forth in claim 1 wherein said housing defines a first pressure chamber passage and a second pressure chamber passage with said first pressure chamber passage extending between said first pressure chamber and an outer surface of said housing and said second pressure chamber passage extending between said second pressure chamber and the outer surface of said housing.

13. A valve as set forth in claim 12 wherein said housing defines an inlet passage extending between said inlet of said bore and the outer surface of said housing.

14. A valve as set forth in claim 13 wherein said head defines an outlet passage extending between said outlet of said head passage and an outer surface of said head.

15. A valve system for controlling a flow of a pressurized working fluid, the system comprising:
a valve including:
a housing defining a bore having an inlet and extending along a longitudinal axis;
a head attached to said housing opposite said inlet of said housing and defining a head passage having an outlet; and
a piston disposed within said bore and defining a piston passage through said piston along said longitudinal axis for communicating the pressurized working fluid therethrough, said piston moveable between an open position allowing fluid communication between said inlet and said outlet and a closed position preventing fluid communication between said inlet and said outlet;
said housing and said piston cooperating together to define a first pressure chamber and a second pressure chamber with said first pressure chamber configured for receiving the pressurized working fluid from one of said bore and said head passage to urge said piston into said closed position and said second pressure chamber configured for receiving the pressurized working fluid from one of said bore and said head passage to urge said piston into said open position;
said housing defining an equalizing chamber in fluid communication with said head passage and configured for communicating a fluid pressure between said head passage and said equalizing chamber to dampen movement of said piston between said closed position and said open position;
wherein said housing and said piston cooperate together to define a first pressure chamber and a second pressure chamber with said first pressure chamber configured for receiving the pressurized working fluid from one of said bore and said head passage to urge said piston into said closed position and said second pressure chamber configured for receiving the pressurized working fluid from one of said bore and said head passage to urge said piston into said open position; and
a first piston seal configured for sealing said first pressure chamber from said bore and a second piston seal configured for sealing said second pressure chamber from said bore;
wherein said piston includes a first portion defining a first diameter and an annular collar portion extending radially outward from said longitudinal axis at an approximate midsection of said first portion to define a second diameter greater than said first diameter;
a first control device configured for selectively controlling fluid flow between said first pressure chamber and one of said inlet and said outlet; and
a second control device configured for selectively controlling fluid flow between said second pressure chamber and one of said inlet and said outlet.

16. A valve system as set forth in claim 15 wherein each of said first control device and said second control device include a solenoid operated valve.

17. A valve as set forth in claim 15 wherein said equalizing chamber is sealed from said first pressure chamber, said second pressure chamber and said inlet of said bore.

18. A valve as set forth in claim 17 wherein said bore and said piston cooperate together to define said equalizing chamber.

19. A valve as set forth in claim 18 wherein said piston defines at least one port extending longitudinally through said first portion of said piston between said equalizing chamber and said head passage.

20. A valve for controlling a flow of a pressurized working fluid, the valve comprising:
a housing defining a bore having an inlet and extending along a longitudinal axis;
a head attached to said housing and defining a head passage having an outlet;
a piston disposed within said bore and defining a piston passage through said piston along said longitudinal axis for communicating the pressurized working fluid therethrough, said piston moveable between an open position allowing fluid communication between said inlet and said outlet and a closed position preventing fluid communication between said inlet and said outlet; and
a drive mechanism coupled to said piston and configured for moving said piston along said longitudinal axis between said open position and said closed position, and for securing said piston in an intermediate position between said open position and said closed position;
said housing defining an equalizing chamber in fluid communication with said head passage and configured for communicating a fluid pressure between said head passage and said equalizing chamber to dampen movement of said piston between said closed position and said open position;
wherein said housing and said piston cooperate together to define a first pressure chamber and a second pressure chamber with said first pressure chamber configured for receiving the pressurized working fluid from one of said bore and said head passage to urge said piston into said closed position and said second pressure chamber configured for receiving the pressurized working fluid from one of said bore and said head passage to urge said piston into said open position; and
a first piston seal configured for sealing said first pressure chamber from said bore and a second piston seal configured for sealing said second pressure chamber from said bore;
wherein said piston includes a first portion defining a first diameter and an annular collar portion extending radially outward from said longitudinal axis at an approximate midsection of said first portion to define a second diameter greater than said first diameter.

21. A valve as set forth in claim 20 wherein said piston includes piston threads and said bore includes bore threads with said piston threads in threaded engagement with said bore threads for threaded movement along said longitudinal axis.

22. A valve as set forth in claim 21 wherein said drive mechanism includes a bevel gear set coupled to said piston and configured for rotating said piston about said longitudinal axis to thread said piston along said bore threads to move said piston along said longitudinal axis.

23. A valve as set forth in claim 22 wherein said bevel gear set includes an annular ring gear disposed concentrically about said longitudinal axis and a stem gear in meshing engagement with said annular ring gear and including a stem portion extending transversely outward from said longitudinal axis to beyond an outer surface of said housing.

24. A valve as set forth in claim 23 wherein said drive mechanism includes at least one rod extending from said annular ring gear along said longitudinal axis into engagement with said piston and configured for rotating said piston about said longitudinal axis in response to rotation of said annual ring gear about said longitudinal axis.

25. A valve as set forth in claim 20 wherein said housing and said piston cooperate together to define a drive chamber within said bore with said drive mechanism at least partially disposed within said drive chamber.

26. A valve as set forth in claim 25 wherein said drive chamber is sealed from said inlet, said equalizing chamber, and said head passage.

* * * * *